United States Patent
Chrzan et al.

(10) Patent No.: US 10,546,337 B2
(45) Date of Patent: Jan. 28, 2020

(54) PRICE SCORING FOR VEHICLES USING PRICING MODEL ADJUSTED FOR GEOGRAPHIC REGION

(71) Applicant: CarGurus, Inc., Cambridge, MA (US)

(72) Inventors: Oliver I. Chrzan, Somerville, MA (US); Mihaela Bujoreanu, Cambridge, MA (US)

(73) Assignee: CarGurus, Inc., Cambridge, MA (US)

( * ) Notice: Subject to any disclaimer, the term of this patent is extended or adjusted under 35 U.S.C. 154(b) by 350 days.

(21) Appl. No.: 13/922,715

(22) Filed: Jun. 20, 2013

(65) Prior Publication Data

US 2014/0257934 A1    Sep. 11, 2014

Related U.S. Application Data

(63) Continuation of application No. 13/906,981, filed on May 31, 2013, now abandoned.

(60) Provisional application No. 61/776,202, filed on Mar. 11, 2013.

(51) Int. Cl.
  *G06Q 30/06*  (2012.01)
  *G06Q 30/02*  (2012.01)

(52) U.S. Cl.
  CPC ..... *G06Q 30/0629* (2013.01); *G06Q 30/0205* (2013.01); *G06Q 30/0206* (2013.01)

(58) Field of Classification Search
  CPC ......... G06Q 50/01; G06Q 30/06–0645; G06Q 30/08; G06Q 30/0205; G06Q 30/0206
  See application file for complete search history.

(56) References Cited

U.S. PATENT DOCUMENTS

| | | |
|---|---|---|
| 4,989,144 A | 1/1991 | Barnett, III |
| 7,113,853 B2 | 9/2006 | Hecklinger |
| 7,228,298 B1 | 6/2007 | Raines |
| 7,421,322 B1 | 9/2008 | Silversmith et al. |
| 7,505,838 B2 | 3/2009 | Raines et al. |
| 7,596,512 B1 * | 9/2009 | Raines ................... G06Q 30/02 705/26.4 |
| 7,693,896 B1 | 4/2010 | Raines |
| 7,778,841 B1 | 8/2010 | Bayer et al. |
| 7,921,052 B2 | 4/2011 | Dabney et al. |
| 7,925,654 B1 | 4/2011 | Raines |
| 8,239,388 B2 | 8/2012 | Raines |
| 8,484,041 B2 | 7/2013 | Yang |
| 8,612,314 B2 * | 12/2013 | Swinson ................ G06Q 30/02 705/27.1 |
| 8,630,920 B2 | 1/2014 | Dumon et al. |
| 8,645,193 B2 * | 2/2014 | Swinson ................ G06Q 10/06 705/26.1 |

(Continued)

OTHER PUBLICATIONS

Bustinza, Maria; Chow, Daniel; Foster, Thaddious; Reese, Tod; Yochum, David; "Price measures of new vehicles: a comparison," Monthly Labor Review 131.7 (Jul. 2008): 19(14).*

(Continued)

*Primary Examiner* — Adam L Levine
(74) *Attorney, Agent, or Firm* — Strategic Patents, P.C.

(57) ABSTRACT

Vehicle pricing such as used vehicle pricing is improved by supplementing statistical modeling techniques with additional algorithms to accommodate factors such as geography and dealer reputation that do not readily yield to regression analysis or similar tools that might be used to characterize a population.

17 Claims, 4 Drawing Sheets

(56) References Cited

U.S. PATENT DOCUMENTS

| | | |
|---|---|---|
| 2003/0069822 A1 | 4/2003 | Ito et al. |
| 2003/0187714 A1 | 10/2003 | Perry et al. |
| 2006/0178973 A1 | 8/2006 | Chiovari et al. |
| 2007/0185777 A1 | 8/2007 | Pyle et al. |
| 2008/0033841 A1 | 2/2008 | Wanker et al. |
| 2008/0312969 A1 | 12/2008 | Raines et al. |
| 2009/0006118 A1 | 1/2009 | Pollak |
| 2010/0070344 A1* | 3/2010 | Taira .................. G06Q 10/067 705/400 |
| 2010/0088158 A1 | 4/2010 | Pollack |
| 2010/0094664 A1 | 4/2010 | Bush et al. |
| 2010/0161408 A1 | 6/2010 | Karson et al. |
| 2010/0262495 A1 | 10/2010 | Dumon et al. |
| 2011/0131652 A1 | 6/2011 | Robinson et al. |
| 2011/0202423 A1 | 8/2011 | Pratt et al. |
| 2012/0130843 A1 | 5/2012 | Himmerick et al. |
| 2013/0006876 A1* | 1/2013 | Swinson ................ G06Q 30/02 705/306 |
| 2014/0258044 A1 | 9/2014 | Chrzan et al. |

OTHER PUBLICATIONS

USPTO, "U.S. Appl. No. 13/906,981, Non-Final Office Action dated Sep. 25, 2015", 22 pages.

USPTO, "U.S. Appl. No. 13/906,981, Final Office Action dated Apr. 19, 2016", 22 pages.

USPTO, "U.S. Appl. No. 13/906,981 Final Office Action dated Dec. 26, 2017", 27 pages.

PR Newswire, "J.D. Power and Associates Ranks Hertz Highest in Second Annual Car Rental Customer Satisfaction Study", p305LAW069. Mar. 5, 1997, 4 pages.

USPTO, "U.S. Appl. No. 13/906,981, Non-Final Office Action dated Jun. 21, 2017", 29 pages.

* cited by examiner

*FIG. 3*

PRICE SCORING FOR VEHICLES USING PRICING MODEL ADJUSTED FOR GEOGRAPHIC REGION

RELATED APPLICATIONS

This application is a continuation of U.S. application Ser. No. 13/906,981 filed May 31, 2013, which claims the benefit of U.S. application Ser. No. 61/776,202 filed on Mar. 11, 2013, each of which the entire content is hereby incorporated by reference.

BACKGROUND

While statistical techniques such as regression permit characterization of a sample of data such as a population of used cars for sale, such models do not readily accommodate certain relevant factors. For example, fair market value for a vehicle may depend on geography. However, the use of geography to restrict a data set for price estimation may reduce available data (e.g., cars list for sale) so much that reliable statistical inferences about fair market value become difficult or impossible. Similarly, factors such as the reputation of a dealer who is offering a listing may be highly relevant to a purchaser when evaluating the desirability of a particular listing, but may not yield a quantitative price adjustment that can be used for comparison to other, similar vehicles.

There remains a need for improved scoring models to assist consumers when comparing listings of used vehicles.

SUMMARY

Vehicle pricing such as used vehicle pricing is improved by supplementing statistical modeling techniques with additional algorithms to accommodate factors such as geography and dealer reputation that do not readily yield to regression analysis or similar tools that might be used to characterize a population.

BRIEF DESCRIPTION OF THE FIGURES

The invention and the following detailed description of certain embodiments thereof may be understood by reference to the following figures:

FIG. 3 shows a web page that contains ranked vehicle listings.

DETAILED DESCRIPTION

All documents mentioned herein are hereby incorporated in their entirety by reference. References to items in the singular should be understood to include items in the plural, and vice versa, unless explicitly stated or otherwise clear from the context. Grammatical conjunctions are intended to express any and all disjunctive and conjunctive combinations of conjoined clauses, sentences, words, and the like, unless otherwise stated or clear from the context. Thus the term "or" should generally be understood to mean "and/or" and so forth.

The following description emphasizes pricing and scoring techniques for used automobiles. However, it should be understood that the methods and systems described herein may be applied to other vehicles such as motorcycles, sport utility vehicles, light trucks, trucks, and the like, and that the methods and systems may also or instead be readily adapted to new vehicle pricing where factors such as geography and dealer reputation may be relevant to a purchasing decision. More generally the methods and systems disclosed herein may be usefully employed in any context where price comparisons are made between similar items offered for sale.

It will also be noted that terms such as price, score and price scoring are frequently used in the following description. Such terms are intended to encompass calculations of price, such as a fair market price for a vehicle, as well as representations of price or value that are relative in nature, such as a price divided by a standard deviation of a regression model for determining price. In general, such various representations of value, or value relative to fair value, may be interchangeably used or calculated with simple, linear scaling or other straightforward adjustments and/or transformations. Any such representation of price or value may be used for ranking or other comparison of items offered for sale, and terms such as "price," "score," and "price score" are intended to include all such variations unless a more specific meaning is explicitly provided or otherwise clear from the context.

Figure 1:
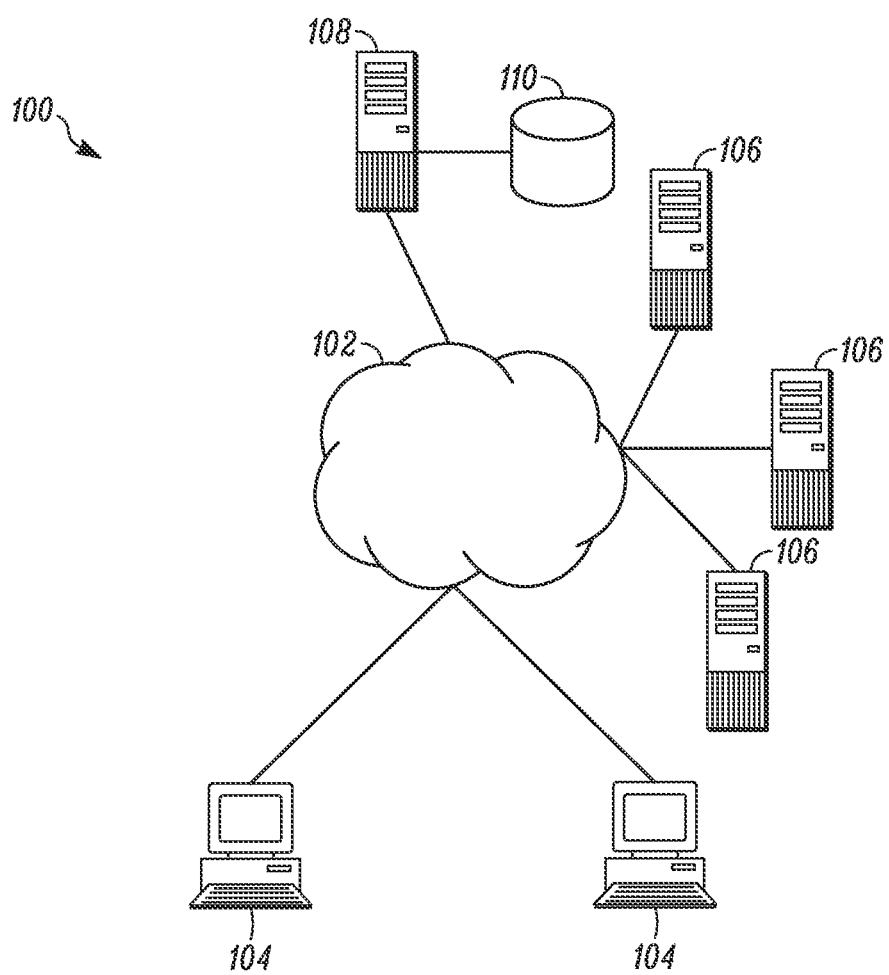
FIG. 1 shows entities participating in a scoring system.

FIG. 1 shows entities participating in a scoring system. The system 100 may include a data network 102 such as the Internet that interconnects any number of clients 104, data sources 106, and a server 108 (which may include a database 110). In general, the server 108 may secure data from the various data sources 106 such as dealer listings and other third party data sources, and construct a price model for determining a fair price for vehicles. This price model can then be deployed to determine relative value for vehicles offered for sale, such as by comparing each listing price to a fair market price determined using the price model. In this manner, the server 108 can respond to inquiries from clients 104 with ranked lists of vehicles offered for sale, where the list is ranked according to a relative value for each listing. Elements of the system 100 are described in greater detail below.

The data network 102 may include any network or combination of networks suitable for interconnecting other entities as contemplated herein. This may, for example, include the Public Switched Telephone Network, global data networks such as the Internet and World Wide Web, cellular networks that support data communications (such as 3G, 4G and LTE networks), local area networks, corporate or metropolitan area networks, wide area wireless networks and so forth, as well as any combination of the foregoing and any other networks suitable for data communications between the clients 104, the data sources 106 and the server 108.

The clients 104 may include any device(s) operable by end users to interact with the server 108 through the data network 102. This may, for example, include a desktop computer, a laptop computer, a tablet, a cellular phone, a smart phone, and any other device or combination of devices similarly offering a processor and communications interface collectively operable as a client device within the data network 102. In general, a client 104 may interact with the server 108 and locally render a user interface such as a web page or the like supporting interaction by the end user with services provided by the server 108.

The data sources 106 may include any sources of data useful for pricing/scoring as contemplated herein. In one aspect, this may include dealer listings, which may be provided as a data feed, database, or the like available through the data network 102 using a suitable programming interface. In another aspect, dealer listings may be obtained from a website using scraping, bots, or other automated techniques. Dealer listings may include information useful for price modeling or relevant to determination of a fair price for a particular vehicle including, without limitation, a vehicle type (e.g., make or model), a vehicle mileage, a vehicle year (of manufacture), a vehicle trim (e.g., option packages, features, etc.), a vehicle transmission, a vehicle condition, a vehicle interior/exterior color, a vehicle history (accident/repair history, rental fleet status, etc.) and so forth. Dealer listings may include other information useful to consumers for decision making but not directly quantitatively applicable to a model for pricing. For example, a listing may include photographs of a vehicle, or a narrative description of the automobile prepared by the dealer. Such information may also be retrieved from the dealer website for use when presenting aggregated listings from the server 108 to a user at a client 104.

In another aspect, data sources 106 may include third party data providers. For example, a variety of commercial services are available that provide vehicle history such as a repair history, a fleet history (use in a rental fleet or commercial fleet of vehicles), a flood damage history, and so forth. Where data such as a vehicle identification number is available in dealer listings, such data may be directly matched to various listings. Other techniques can be used to correlate such third party data to vehicle listings or otherwise infer vehicle condition or history. Other data such as data provided by government agencies may, where available, provide useful information relating to vehicle title, vehicle inspection history, vehicle mileage, vehicle accident history, and so forth.

The server 108 may in general be configured as described above to create one or more price models using data obtained from the data sources 106, and to respond to user inquiries from the clients 104 with ranked lists and other data. In embodiments, the server 108 may employ multilinear regression analysis to derive a pricing model that relates vehicle price to various vehicle attributes. The resulting model may take the general form:

$$y_i = \beta_1 x_{i1} + \beta_2 x_{i2} + \ldots + \beta_p x_{ip} + \varepsilon_i \qquad [\text{Eq. 1}]$$

where $x_{ij}$ is the $i^{th}$ observation on the $j^{th}$ independent variable (where the first independent variable takes the value 1 for all i). A model may be created, for example, for each vehicle type, and the regression parameters, $\beta$, for each such model may be calculated for independent variables such as the condition, the mileage, the year, and so forth from the data sources 106. It will be readily appreciated that, while the residual error may be minimized for any given data set, the goodness of fit for a model and the statistical significance of the estimated parameters may be subject to review, and the model may be revised, e.g., by the addition or removal of parameters or the removal of outlier observations, until an adequate model is obtained. Such a process may be manual, automated, or some combination of these, and may be informed by subjective or objective characterizations of the quality of the resulting model. Suitable objective criteria for various models include a standard error, an R-squared analysis of residuals, an F-test of overall fit, and a t-test for individual regression parameters.

It will be understood that a variety of other statistical techniques such as nonlinear regression, curve-fitting, and so forth may be appropriate in various data modeling contexts. More generally, a wide range of modeling techniques are known in the art for predictive analysis including without limitation neural networks, fuzzy logic models, case-based reasoning, rule-based systems, regression trees, and so forth, any of which may be employed to computationally derive suitable predictive algorithms for fair market value. Furthermore, numerous computational techniques are known for estimating parameters for a regression model including without limitation percentage regression, least absolute deviations, nonparametric regression, distance metric learning, and so forth, any of which may be suitably employed for various types of populations or data sets. Still more generally, these techniques are provided by way of non-limiting examples, and any such techniques or other techniques, as well as combinations of the foregoing, may be usefully adapted to obtain predictive models for vehicle price that can be implemented by the server 108. All such variations are intended to fall within the scope of the term "model" as used herein unless a different meaning is explicitly provided or otherwise clear from the context.

However derived, a price model may be stored in the database 110 along with underlying data for vehicle listings. The server 108 may be configured to calculate fair market value according to the price model, and to provide this information to clients 104, such as in the form of a ranked list of vehicles for sale. The list may be ranked according to a price score that provides a dimensionless, numerical representation of relative value. In one embodiment, a price score, S, for a vehicle may be calculated as:

$$S = \frac{P_{fm} - P_l}{\sigma} \qquad [\text{Eq. 2}]$$

where $P_{fm}$ is the fair market value of the vehicle (as calculated using the price model), $P_l$ is the list price at which the vehicle is offered for sale (according to the vehicle listing), and $\sigma$ is the standard deviation for the price model. A list of results ranked according to the price score may be transmitted from the server 108 to one of the clients 104, along with related data for each vehicle (photos, narrative description, attributes, etc.) so that a user of the client 104 can browse listings and compare vehicles listed for sale.

It will be understood that while a single server 108 is depicted in FIG. 1, any number of logical servers or physical servers may be used as the server 108 according to, e.g., server traffic, desired level of service, and so forth. Similarly, server functionality may be divided among different platforms in a number of ways. For example, one server or group of servers may be used to obtain data from the data sources 106 and create price models for various vehicle types. Another server or group of servers may be configured to provide a web interface for receiving and responding to client requests for vehicle price information using the price model(s) created by the first group of servers. Any such configuration suitable for responding to clients 104 based upon user-provided parameters and data obtained from the data sources 106 may be employed as the "server" described herein.

Having described a general system for providing ranked listings of vehicles for sale in response to client requests, this description now turns to modifications and adaptations to such a system that address certain characteristics of vehicle listings that are not amenable to direct price modeling.

Figure 2:
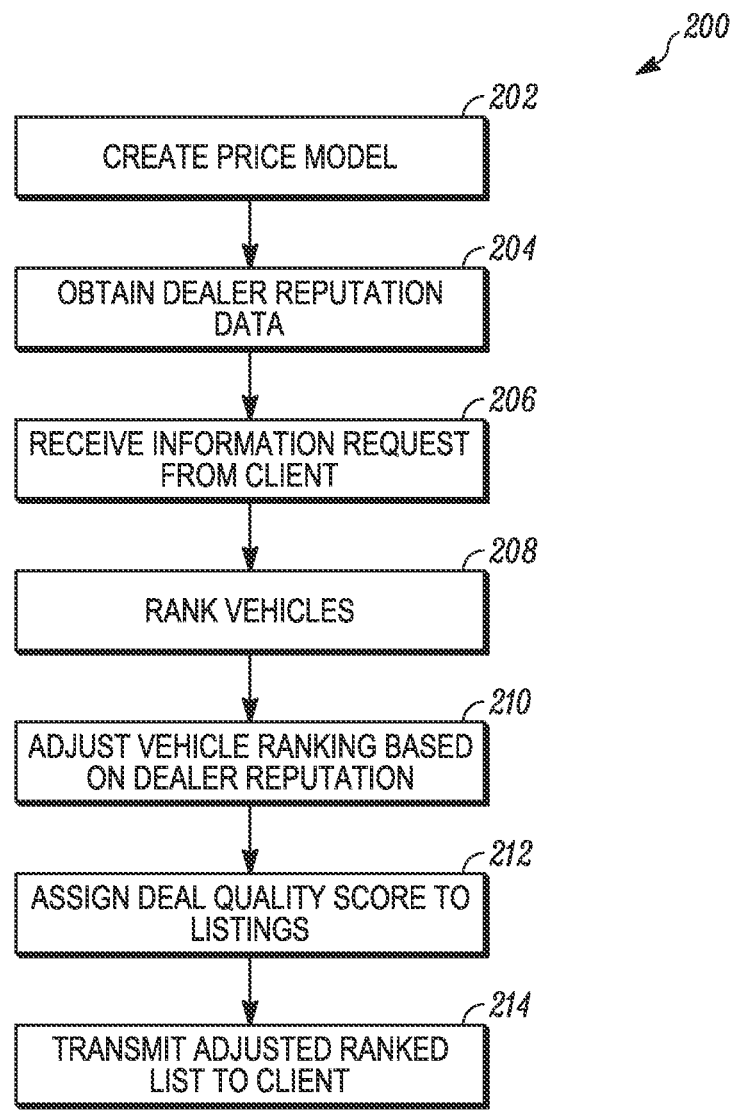
FIG. 2 is a flow chart of a method for ranking vehicle listings.

FIG. 2 is a flow chart of a method for ranking vehicle listings.

As shown in step 202, the method 200 may include creating a price model. This may include using any of the data sources and modeling techniques described above to create a predictive model relating various vehicle attributes to a fair market price. By way of non-limiting example, this may include creating a regression model as described above so that a fair market price for vehicles can be determined using the regression model. The regression model may use any of a number of regression parameters such as a vehicle condition, a vehicle trim, a vehicle fleet history, a repair history and/or a flood damage history. A vehicle type may also be used as a regression parameter, or a different regression model may be constructed for each vehicle type, or some combination of these according to, e.g., the variability in configurations of different vehicles of a particular "type" or the quantity and quality of data for a type. As described above, creating a price model may include retrieving vehicle listings from a plurality of online sources and creating the regression model using the vehicle listings. This may also or instead include retrieving vehicle data for each vehicle from a number of different data sources, such as third party data sources that provide specific types of vehicle data.

As shown in step 204, the method may include obtaining dealer reputation data. This may include a variety of data gathering techniques which may be used alone or in combination with one another. In one aspect, this may include transmitting a number of surveys to a number of purchasers of vehicles and processing responses to the surveys to determine the dealer reputation for the corresponding dealers. Such data may be conveniently gathered for purchasers who shop for and purchase vehicles using the server described above through the use of automated electronic surveys or the like, and such survey information may be gathered during an online interaction related to the purchase, or in a subsequent communication such as an electronic mail or the like sent to purchasers after completing transactions that were initiated through the server. In such a survey, a dealer may be evaluated against one or more criteria using an objective scale (e.g., one to five), and the results may be aggregated in any suitable manner for each dealer. Although depicted sequentially in FIG. 2, there is no particular reason for dealer data to be preferentially gathered before or after creation of a pricing model. These two steps may occur concurrently, sequentially or asynchronously. For example, dealer reputation data may be accumulated over long periods of time, and may remain relevant for extended periods. Thus this data may be gathered and updated incrementally as new survey data becomes available, or on some scheduled or other periodic basis such as once per hour, once per day, once per week, or on any other suitable schedule. By contrast, fair market value may be preferably modeled as an instantaneous, current value, and the various price models might be updated at the greatest possible or practical rate to provide current data. Thus price models may be updated once per hour, once per day, or on any other schedule according to, e.g., processing resources available to create new models and the rate of change in data sources used to create the price models.

As shown in step 206, the method 200 may include receiving a request for vehicle information from a client. This may, for example, include a request posted to a web page from a client device that includes a vehicle make, model, trim, mileage, year and other attributes to narrow or define a search. Attributes may be specified in a variety of ways such as with a range of possible values (e.g., for mileage, year or list price) or as a filter to include or exclude certain attributes such as a vehicles having a certain trim, feature, option package or the like. Where a server provides data for both new and used vehicles, these categories may be modeled differently, and a web site or other interface for configuring the user inquiry may request this information first. More generally, techniques for gathering such information interactively from a user of a client device are well known in the art, and such techniques may be used in any suitable manner to parameterize a user request for vehicle information.

As shown in step 208, the method 200 may include ranking a number of vehicles responsive to the request (e.g., meeting the various parameters of the request). The ranking may be based upon a relative value using a difference between a fair market price and a listing price for each of the number of vehicles. The relative value may be a dimensionless value normalized according to a standard deviation of prices for the number of vehicles, such as by using the price score shown above in Eq. 2. In this manner, a ranked list of the vehicles may be provided.

While a ranking based upon relative dollar value provides useful information to a consumer who is considering various similar vehicles, other information may be relevant to a purchasing decision even though the other information does not directly affect the fair market value of a vehicle. For example, dealer reputation may be relevant to the desirability of a vehicle, or to the expected purchasing experience for the vehicle, even where the reputation of a seller does not directly translate to a change in the fair market value of the vehicle. That is, one vehicle having certain attributes may be more or less desirable than another vehicle with the same attributes because of the differences in the dealers offering each vehicle for sale, even though the vehicles are objectively identical (and therefore of equal value). In order to address such noneconomic factors, rankings may be adjusted to account for additional information. Or stated slightly differently, vehicles may be ranked using a scoring system that accounts for such factors in addition to a price model that is based upon objective vehicle attributes.

As shown in step 210, the method 200 may include adjusting a position of one of the vehicles in the ranked list according to a dealer reputation for a dealer offering the vehicle for resale, thereby providing an adjusted ranked list. More generally, one, some or all of the vehicles may receive an adjusted ranking according to a dealer reputation for each corresponding listing. In general, a scoring system may be devised to account for dealer reputation that complements the scheme used for determining fair market value, i.e., that permits reputation-based scoring to supplement rather than substitute for scoring based on objective vehicle attributes. In one aspect, a Bayesian average or similar metric for dealer reputation may be calculated. A Bayesian average advantageously provides a weighting for each dealer's reputation in proportion to the amount of reputation data available. So for example, where each dealer is evaluated on a scale of 1-5 by n customers, this data may be combined in a weighted manner with other dealer reputation data using an averaging formula of the general form:

$$\bar{x} = \frac{Cm + \sum_{i=1}^{n} x_i}{C + n} \quad [\text{Eq. 3}]$$

where m is a population mean and C is an assigned value. The constant, C, may for example represent the average number of reputations scores for each dealer, or any other number according to a desired weighting of the reputation of a particular dealer toward the population mean.

As a result of such an adjustment, when vehicle results are displayed to a client, certain listings that appear to offer a better economic deal may under certain circumstances be ranked lower than other listings of lesser or equal relative value. In this manner, cars may be ranked according to the manner in which dealer reputation influences desirability without changing estimated fair value based on objective attributes. It should be appreciated that this approach contemplates a separation of reputation affects from attribute-based value, so that two identical automobiles will have the same fair market price regardless of the respective reputations of dealers offering such vehicles for sale. In an alternative scoring system, the dealer reputation may also be used to adjust perceived economic value. For example, a scaling factor based upon the dealer reputation may be used to adjust a calculated fair price for each vehicle. This may, e.g., take a form such as:

$$\Delta P = k(\bar{x} - m) \quad [\text{Eq. 4}]$$

where m and $\bar{x}$ are the population mean and the individual dealer mean respectively (see Eq. 3 above), and where k is an empirically selected scaling factor. In one practical application, a scaling factor of about 0.2 standard deviations (for the price model) has been found to yield satisfactory results for a price adjustment, $\Delta P$. Thus it will be appreciated that separately calculating affects of dealer reputation does not prevent corresponding adjustments to price, and the impact of reputation may be expressed as a non-dollar denominated "score" that influences ranking, or the impact may be directly incorporated into a price calculation after attribute-based calculations are completed.

As shown in step 212, the method 200 may include assigning a deal quality score to a portion of the adjusted ranked list and transmitting the deal quality score for one or more listings within the adjusted ranked list to the client. The deal quality score may be a figure of merit calculated for each listing, or the deal quality score may be a categorical score, which may be based on percentiles or other ranking ranges, or some combination of these. Thus, for example, the bottom twenty percent (or any other suitable percentile range) may be given a deal quality score of "bad deal" or "poor deal", and the top twenty percent (or any other suitable percentile range) may be given a deal quality score of "great deal" or "good deal". Groups of vehicles within various percentile ranges may be given corresponding, intermediate rankings, which may be determined with any suitable or convenient degree of granularity. For a quantitative figure, the deal quality score may, for example, be a numerical representation of relative value such as that provided by Eq. 2, or any other suitable representative number. It should also be noted that the relative value may be based on the fair market value either before or after accounting for dealer reputation as discussed above, and may be dimensionless, or may be expressed in dollars or any other suitable units.

As shown in step 214, the method 200 may include transmitting one or more items in the adjusted ranked list to a client for display. This may include associated data such as a deal quality score, a fair market value, a relative value, a numerical ranking and any other calculated data for each listing, along with metadata such as photographs, narrative description, and contact information or a location where the vehicle is offered for sale (and/or available for inspection).

It will be appreciated that the methods disclosed with reference to FIG. 2 may be deployed in the system disclosed with reference to FIG. 1 to provide a vehicle price evaluation system that includes a database and a server configured to receive a request from a client for vehicle information and to transmit to the client an adjusted ranked list responsive to the request. The database may, for example, store one or more regression models that characterize a fair market value of a vehicle according to a number of regression parameters. The database may store a plurality of regression models for different vehicles along with individual vehicle listings. The processor may be configured to select a best one of the plurality of regression models for a type of vehicle specified in the request, and to provide ranked lists and other data to clients as generally discussed above.

For example, the server (or other location and/or computing hardware) may include a processor configured to rank a number of vehicles responsive to a request based upon a relative value using a difference between a fair market price for each of the number of vehicles determined using the regression model and a listing price for each of the number of vehicles. The relative value may be a dimensionless value normalized according to a standard deviation of prices for the number of vehicles, thereby providing a ranked list. The processor may be further configure to adjust a position of one of the vehicles in the ranked list according to a dealer reputation for a dealer offering the one of the vehicles for resale, thereby providing the adjusted ranked list.

Such a system may include a dealer evaluation module, e.g., in software executing on the server or some other server, to transmit a survey to a purchaser of a vehicle and to process a survey response to determine the dealer reputation for the dealer. In this manner, dealer reputation data may be gathered for improved vehicle rankings as described above.

Figure 3:
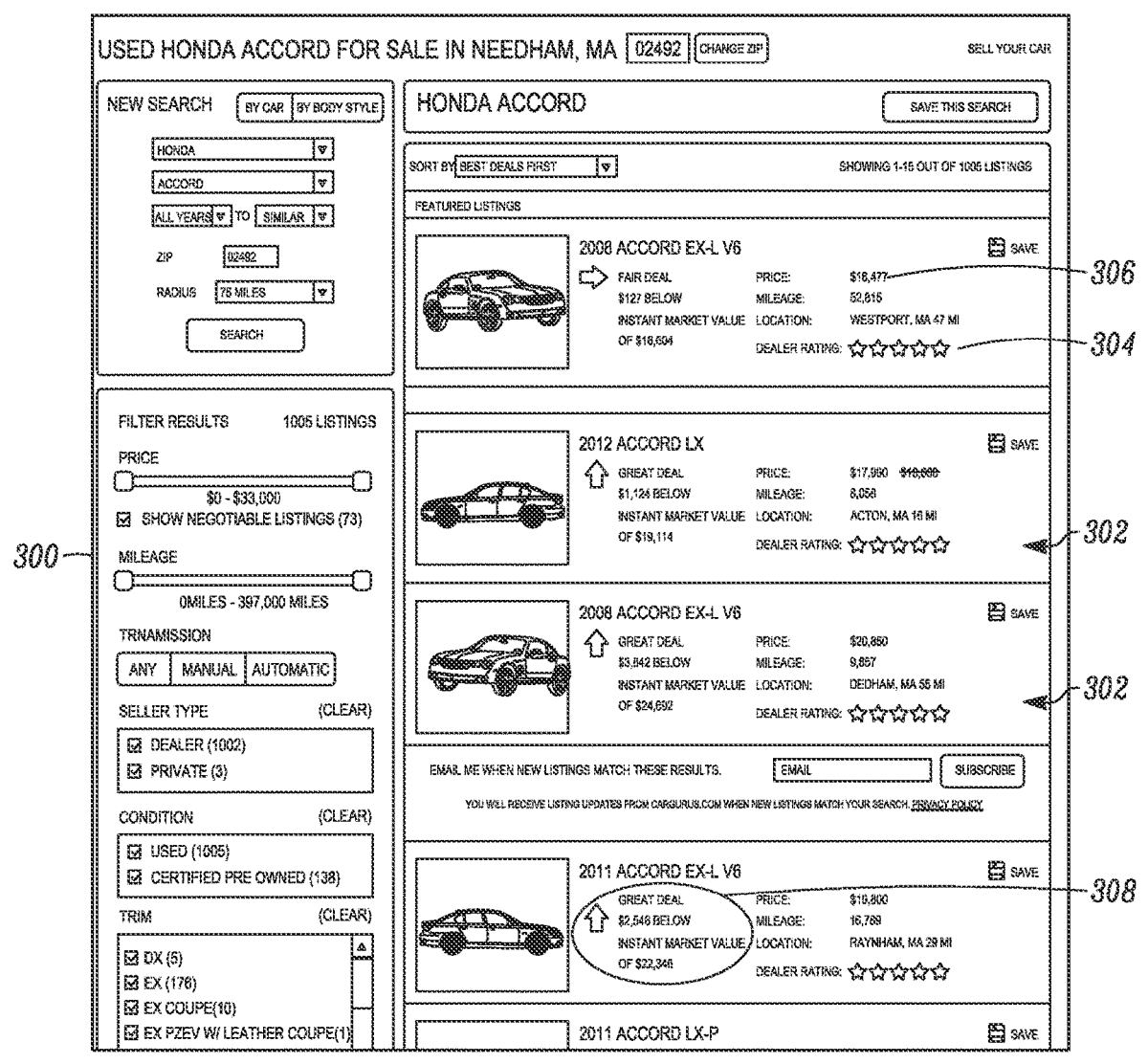

FIG. 3 shows a web page that contains ranked vehicle listings. The web page 300 may be transmitted from a server such as any of the servers described above to a client. The web page 300 may include a number of listings 302 ranked according to relative value, adjusted for dealer reputation as described above.

Each listing 302 may include additional data such as a dealer rating 304, a list price 306, a deal quality score 308 and any other information characterizing a particular listing or information about the listed vehicle. The deal quality score 308 may include various representations of deal quality such as text (e.g., "Great Deal," "Fair Deal," etc.), a graphic (e.g., an up arrow, down arrow or sideways arrow), a quantitative statement of value (e.g. "$1,134 BELOW fair market value", "Top Ten!", "top ten percent", etc.) or any other representation or combination of representations of the quality of each listing.

The web page 300 may also include a variety of tools to provide or revise search parameters including, for example, sliders to specify ranges, drop down lists to select from among a number of options, text boxes to enter search terms and check boxes to specify use of various filters. More generally, any controls that can be used to parameterize user input within a web page or other interface may be used to gather user input specifying a vehicle search.

Figure 4:
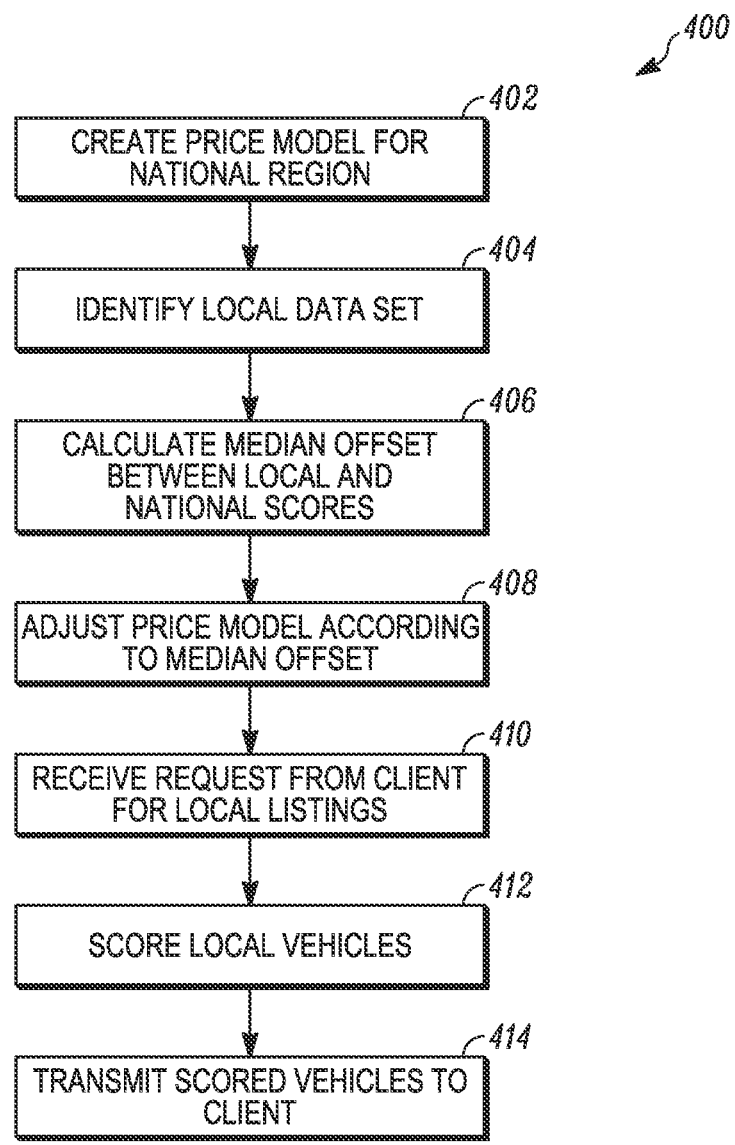
FIG. 4 is a flow chart of a method for making geographic adjustments to vehicle prices.

FIG. 4 is a flow chart of a method for making geographic adjustments to vehicle prices. In general, a price model developed for a national market may provide accurate inferences concerning the affect of various vehicle attributes on fair market value. At the same time, metropolitan markets may exhibit a skew in average vehicle prices due to local differences in tastes, incomes, vehicle availability, and so forth. Using the following techniques, a pricing model can realize accurate attribute-based pricing based upon a large population of vehicles while reducing nationally-influenced excursions from local pricing norms.

As shown in step 402, the method 400 may include creating a pricing model for fair market value of a vehicle type based upon a first data set of vehicles obtained from a first geographic region. The pricing model may be any of the models described above. For example, the pricing model may be a regression model based on a plurality of regression parameters such as a model, a year, a mileage, and a trim. Other regression parameters such as a rental fleet history, a repair history and a flood damage history may also or instead be used. The first geographic region may be a national region, with the first pricing model being a corresponding national model that includes vehicle data for the entire country, or the first geographic region may be some other large geographic area that consistently provides a large data set for price estimation.

As shown in step 404, the method 400 may include identifying a second data set, such as a local data set, of vehicles from a second geographic region within the first geographic region. For example, where the first geographic region is a national region, the second geographic region may be a metropolitan region within the national region. Any practical technique may be employed to define the second geographic region and to select vehicles for inclusion in the second data set. For example, the second data set may be based on zip codes or other geographically identifiable regions within a predetermined radius of a metropolitan center. The second data set may also non-exclusively include vehicle data for a number of adjacent metropolitan regions. That is, a listing on an outlying perimeter of one metropolitan center may also be included in similar data sets for adjacent metropolitan centers. Where a large radius (e.g., seventy five miles) is used about each metropolitan area and a large number of metropolitan regions (e.g., the one hundred largest metropolitan centers) are to be analyzed, overlapping geographies will frequently occur. By non-exclusively using perimeter data for each such overlapping metropolitan region, differences in pricing bias between adjacent metropolitan areas can be normalized somewhat to reduce significant pricing discontinuities between geographically proximate listings associated with different metropolitan centers.

A rural region may also be created for each state or other recognizable geographic expanse to account for listings that are not within the predetermined radius about any of the metropolitan regions used for calculating median offsets from the national model.

As shown in step 406, the method 400 may include calculating a median offset between local and national data. For example, a median offset may be calculated between a first median for the first data set scored according to the pricing model (e.g., national scores) and a second median for the second data set scored according to the pricing model (e.g., local scores). More generally, any representation of a bias between local and national pricing may be usefully employed as a median offset when scoring a local data set using a national model.

As shown in step 408, the method 400 may include adjusting the pricing model according to the median offset to provide an adjusted pricing model for the second geographic region. For example, price or score calculations for vehicles in a local or regional market may be adjusted by using the difference between the two medians as an offset to adjust scores calculated using a national model. In effect, this uses all of the pricing information available from national data to construct a pricing model, while preserving aggregate biases peculiar to local markets.

As shown in step 410, the method 400 may include receiving a request from a client for local listings. The request may specify a geographic region such as a metropolitan region or city within the first geographic region.

As shown in step 412, the method 400 may include scoring a number of vehicles within the second geographic region with the adjusted pricing model, thereby providing scored vehicles. Where the second data set non-exclusively includes data from adjacent metropolitan regions, the number of vehicles scored for presentation to a client is preferably formed from an exclusive subset of the listings in the second data set. Thus the scored vehicles may be selected from a smaller region within the second geographic region and closer to the corresponding metropolitan center. This approach generally returns vehicle listings more responsive to a client request that specifies a particular metropolitan region. This also has the practical advantage of ensuring that a particular vehicle is not listed twice (e.g., for two adjacent metropolitan regions) with different estimated fair market values.

As generally described above, the pricing model may calculate an estimated fair market value, or the pricing model may calculate a relative or absolute metric representative of deal value. Thus, the numeric quantity calculated in the scoring process may be a dollar amount, or a numeric score relative to a standard deviation for the pricing model, or a score expressed or normalized in any other manner suitable for ranking vehicle listings. It will be appreciated that scoring of vehicles for a metropolitan region may be performed dynamically (i.e., in response to a specific client request), or scoring may be precomputed for use in response to multiple client requests.

As shown in step 414, the method 400 may include transmitting the scored vehicles to a client for display. This may include transmitting a web page such as the web page describe above, along with any vehicle information, deal quality evaluation, or other data useful to a consumer in reviewing and comparing vehicle listings. As noted above, the number of vehicles scored and transmitted to clients may be a subset of the second data set used to determine the median offset, and may more particularly be a subset of the second data set exclusive to one of the number of metropolitan regions. For example, where a request from a client specifies listings within a city, the number of listings returned may be a subset of the second data set including listings exclusively associated with that city. Thus a first, non-exclusive data set may be used when determining a median offset for a metropolitan region, while a second, exclusive data set selected from within the non-exclusive data set may be used when calculating market value and returning listings to a client for the metropolitan region.

A server may be configured to perform regional pricing and respond to user requests for listings as generally described above. Thus in one aspect there is disclosed herein a system including a database storing a national regression model that characterizes a fair market value of a vehicle according to a number of regression parameters based upon a national market; a server configured to receive a request from a client for vehicle listings in a metropolitan market within the national market and to transmit to the client an adjusted ranked list responsive to the request; and a processor configured to select a number of vehicles responsive to the request, to calculate a score for ranking the number of vehicles using the national regression model, and to adjust the score for each of the number of vehicles according to a difference between a first median score for the number of vehicles within the metropolitan market using the national regression model and a second median score for vehicle listings within the national market, thereby providing the adjusted ranked list.

The processor may be a processor within the server, and the database may be any suitable memory device. The score returned to a client for a particular vehicle may be a price, or the score may be a relative value based upon a difference between a fair market price and a listing price for one of the number of vehicles relative to a standard deviation for the metropolitan regression model.

A number of variations are possible for the above pricing techniques. In one aspect, dealer reputation and regional adjustments may be combined to provide scoring that reflects local market conditions and the reputations of dealers offering certain vehicles for sale. In another aspect, further refinements may be made to regional price calculations. For example, certain vehicle attributes may be subject to different local pricing, such as where a particular feature is valuable in one region but not in another. Where a particular feature of a vehicle is uncorrelated or negatively correlated to price between two different regions, the corresponding vehicle attribute may be excluded from a national model and/or independently priced within each geographic region. Thus in one aspect the methods disclosed herein may include identifying a vehicle attribute that has a geography-dependent influence on price and modeling that vehicle attribute independently from a regression model used for other vehicle attributes.

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors, or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

It should further be appreciated that the methods above are provided by way of example. Absent an explicit indication to the contrary, the disclosed steps may be modified, supplemented, omitted, and/or re-ordered without departing from the scope of this disclosure.

The method steps of the invention(s) described herein are intended to include any suitable method of causing such method steps to be performed, consistent with the patentability of the following claims, unless a different meaning is expressly provided or otherwise clear from the context. So for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps.

While particular embodiments of the present invention have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A method for estimating vehicle values in a local geographic region based on national listing data, the method comprising:
    obtaining listing data with a first server for vehicles from a number of data sources including one or more data feeds, databases, or websites containing dealer listings coupled to a data network;
    creating a pricing model with the first server using the listing data for fair market value of a vehicle type based upon a first data set of vehicles in the listing data obtained for a first geographic region, wherein the pricing model relates vehicle prices to various vehicle attributes for the first data set of vehicles;
    receiving a request from a client device over the data network to a web interface of a second server, the request including one or more attributes to narrow or define a search for vehicle listings, and the request further specifying that resulting vehicle listings are local listings in a second geographic region within the first geographic region;
    identifying a second data set of vehicles in the listing data from the second geographic region within the first geographic region including vehicles responsive to the request;
    calculating a first median for the first data set scored according to the pricing model;
    calculating a second median for the second data set scored according to the pricing model;
    calculating a median offset between the first median and the second median;
    adjusting the pricing model for use when scoring vehicles within the second geographic region by using the median offset to adjust scores calculated for vehicles within the second geographic region using the pricing model for the first geographic region, thereby providing an adjusted pricing model for the second geographic region;

with the second server, scoring a number of vehicles within the second geographic region with the adjusted pricing model, thereby providing scored vehicles;

creating a web page responsive to the request including the scored vehicles within the second geographic region that have been scored according to the adjusted pricing model; and transmitting the web page including the scored vehicles to the client device over the data network for display at the client device to facilitate comparison shopping for vehicles within the second geographic region by a user of the client device.

2. The method of claim 1 wherein the pricing model is a regression model based upon a plurality of regression parameters including one or more of a model, a year, a mileage, and a trim.

3. The method of claim 1 wherein the pricing model is a regression model based upon a number of regression parameters including one or more of a rental fleet history, a repair history and a flood damage history.

4. The method of claim 1 wherein the first geographic region is a national region.

5. The method of claim 1 wherein the second data set non-exclusively includes vehicle data for a number of metropolitan regions.

6. The method of claim 5 wherein the number of vehicles is a subset of the second data set exclusive to one of the number of metropolitan regions.

7. The method of claim 6 wherein the one of the number of metropolitan regions is a city responsive to a request from the client for listings within the city.

8. The method of claim 1 wherein the second geographic region is a metropolitan region within the first geographic region.

9. The method of claim 1 wherein the pricing model calculates a vehicle price.

10. The method of claim 1 wherein the pricing model calculates a score relative to a standard deviation for the pricing model.

11. A computer program product for estimating vehicle values in a local geographic region based on national listing data, the computer program product comprising computer executable code embodied in a non-transitory computer-readable medium that, when executing on one or more computing devices, performs the steps of:

obtaining listing data with a first server for vehicles from a number of data sources including one or more data feeds, databases, or websites containing dealer listings coupled to a data network;

creating a pricing model with the first server using the listing data for fair market value of a vehicle type based upon a first data set of vehicles in the listing data obtained for a first geographic region, wherein the pricing model relates vehicle prices to various vehicle attributes for the first data set of vehicles;

receiving a request from a client device over the data network to a web interface of a second server, the request including one or more attributes to narrow or define a search for vehicle listings, and the request further specifying that resulting vehicle listings are local listings in a second geographic region within the first geographic region;

identifying a second data set of vehicles in the listing data from the second geographic region within the first geographic region including vehicles responsive to the request;

calculating a first median for the first data set scored according to the pricing model;

calculating a second median for the second data set scored according to the pricing model;

calculating a median offset between the first median and the second median;

adjusting the pricing model for use when scoring vehicles within the second geographic region by using the median offset to adjust scores calculated for vehicles within the second geographic region using the pricing model for the first geographic region, thereby providing an adjusted pricing model for the second geographic region;

with the second server, scoring a number of vehicles within the second geographic region with the adjusted pricing model, thereby providing scored vehicles;

creating a web page responsive to the request including the scored vehicles within the second geographic region that have been scored according to the adjusted pricing model; and transmitting the web page including the scored vehicles to the client device over the data network for display at the client device to facilitate comparison shopping for vehicles within the second geographic region by a user of the client device.

12. The computer program product of claim 11 wherein the pricing model is a regression model based upon a plurality of regression parameters including one or more of a model, a year, a mileage, a trim, a rental fleet history, a repair history and a flood damage history.

13. The computer program product of claim 11 wherein the first geographic region is a national region.

14. The computer program product of claim 11 wherein the second data set non-exclusively includes vehicle data for a number of metropolitan regions.

15. The computer program product of claim 14 wherein the number of vehicles is a subset of the second data set exclusive to one of the number of metropolitan regions.

16. The computer program product of claim 11 wherein the second geographic region is a metropolitan region within the first geographic region.

17. The computer program product of claim 11 wherein the pricing model calculates a score relative to a standard deviation for the pricing model.

* * * * *